DOMAIN PROPAGATION ARRANGEMENT

Filed Sept. 17, 1968 3 Sheets-Sheet 1

INVENTOR
A. J. PERNESKI
BY Herbert M. Shapiro
ATTORNEY

DOMAIN PROPAGATION ARRANGEMENT

Filed Sept. 17, 1968 3 Sheets-Sheet 3

3,543,252
DOMAIN PROPAGATION ARRANGEMENT

Anthony J. Perneski, Martinsville, N.J., assignor to Bell Telephone Laboratories, Incorporated, Murray Hill, N.J., a corporation of New York Filed Sept. 17, 1968, Ser. No. 760,244
Int. Cl. G11c *11/14, 19/00*
U.S. Cl. 340—174 8 Claims

ABSTRACT OF THE DISCLOSURE

A magnetic field rotating in the plane of a magnetic sheet can be made to select a propagation channel for single wall domains in that sheet in the absence of peripheral conductors. Each of a plurality of propagation channels is defined in the sheet by a different pattern of magnetically soft overlays. Each overlay pattern exhibits a different moving magnetic pole configuration in response to the rotating field. The field is typically supplied by a pulse generator which generates a field at consecutive orientations A, B, C and D, 90 degrees apart, For each permutation of the sequence of fields (i.e., ABDC or ADBC . . . etc.), the pole configuration in only a selected one of the plurality of channels is proper for domain movement.

FIELD OF THE INVENTION

This invention relates to data processing arrangements and, more particularly, to such arrangements employing magnetic media in which single wall domains can be propagated.

BACKGROUND OF THE INVENTION

A single wall domain is a magnetic domain bounded by a domain wall which closes on itself and has a geometry independent of the boundary of the sheet in the plane in which it is moved. The domain conveniently assumes the shape of a circle (viz, cylinder) in the plane of the sheet and has a stable diameter determined by the material parameters. A bias field of a polarity to contract domains insures movement of domains as stable entities. The Bell System Technical Journal, volume XLVI, No. 8, October 1967, at pages 1901 et seq., describes the propagation of single wall domains in a propagation medium such as a sheet of a rare earth orthoferrite.

The movement of domains is accomplished normally by generating consecutively offset localized fields (actually field gradients) of a polarity to attract domains. In this manner, a domain follows the consecutive attracting fields from input to output positions in the sheet. A three-phase propagation operation provides the directionality along a selected propagation path in a manner consistent with the teaching of the prior art.

The propagation wiring pattern assumes a geometry dictated by the material in which the domains are moved. A typical material is a rare earth orthoferrite. These materials have preferred directions of magnetization substantially normal to the plane of the sheet. If we adopt the convention that a sheet is saturated magnetically in a negative direction along an axis normal to the plane of the sheet, the magnetization of a single wall domain is in the other or positive direction along that axis. The domain then may be represented as an encircled plus sign where the circle represents the domain wall. The propagation wiring pattern is conveniently in the form of consecutively offset closed loops to correspond to the circular geometry of the domain.

The geometry of the propagation wiring pattern determines the packing density in a magnetic sheet in which single wall domains are moved. Current requirements for generating propagation fields dictate minimum cross-sectional areas for the propagation conductors. When next adjacent conductors are closely spaced, however, the thickness of the conductors cannot be made disproportionately large. Rather, as the thickness of the conductors is increased, the width increases thus reducing the spacing between conductors at the risk of causing short circuits therebetween. Consequently, the width of the conductors and the spacings between them are made relatively large to accommodate the desired current. Further, the loop configuration requires a minimum dimension along the axis of propagation dictated by the width of two conductors plus the opening encompassed thereby for each domain position. Photoresist techniques permit depositions in the submil range with reproducible results. But the minimum domain position size, of course, is several times larger than that dimension because of the loop pattern. Also, not all domain positions can be occupied simultaneously because the three-phase propagation cycle which provides directionality along a propagation channel requires some unoccupied domain positions. Thus, as much as about 10 mils are allocated for each bit location. Yet domains in the submicron size have been observed. A relatively high packing density could be realized if the necessity for discrete propagation conductors were eliminated.

But it is difficult to achieve selectivity in domain movement and the realization of logic operations with domains in the absence of discrete propagation conductors. Copending application Ser. No. 657,877, filed Aug 2, 1967, for A. H. Bobeck, H. E. D. Scovil and W. Shockley, for example, describes a number of logic operations employing single wall domains. The operations employ discrete propagation conductors for effecting domain motion on a selective basis and turn to account interactions between neighboring domains.

An object of the present invention is to provide a multiple channel single wall domain propagation device in which channel selection operations can be achieved in the absence of discrete propagation conductors.

Copending application Ser. No. 732,705, filed May 28, 1968 for A. H. Bobeck describes a domain propagation arrangement in which single wall domains are moved synchronously in a sheet of magnetic material along channels defined by magnetically soft overlays of bar and T-shaped geometry. The overlays exhibit attracting pole configurations which move from input to output positions in respective channels responsive to a magnetic field rotating in the plane of the sheet in which the domains are moved. Inasmuch as the rotating field is in a direction transverse to the preferred direction of magnetization in a domain, it has only negligible direct effect on the domain.

A rotating transverse field can be generated by a magnetometer, by sine-wave generators generating appropriately oriented sine-wave fields 90 degrees out of phase with one another, or by pulse techniques. A description of this invention is simplified if rendered in terms of pulse techniques. Consider a top view of a sheet in the plane of which a magnetic field is being rotated say clockwise to consecutive positions at 90 degrees with respect to one another. Such a field is conveniently generated by current pulses in coils appropriately positioned normal to the plane of the sheet to provide the requisite field when pulsed. Consider two orthogonal pairs of coils spaced apart and pulsed in pairs to provide uniform fields in the magnetic sheet. The first pair generates plus and minus fields along an X axis of the plane of the sheet; the second generates plus and minus fields along a Y axis of the plane. Let us designate the fields +X +Y, and −X, −Y in a general form as ABCD.

BRIEF DESCRIPTION OF THE INVENTION

In accordance with this invention one of twenty-four (four factorial) channels can be selected by permuting the fields ABCD. In accordance with one embodiment of this invention twenty-four channels are defined by overlay patterns each one of which has at least a portion which generates an appropriately moving attracting pole configuration in response to a unique permutation of the fields ABCD.

DETAILED DESCRIPTION

Figure 1:
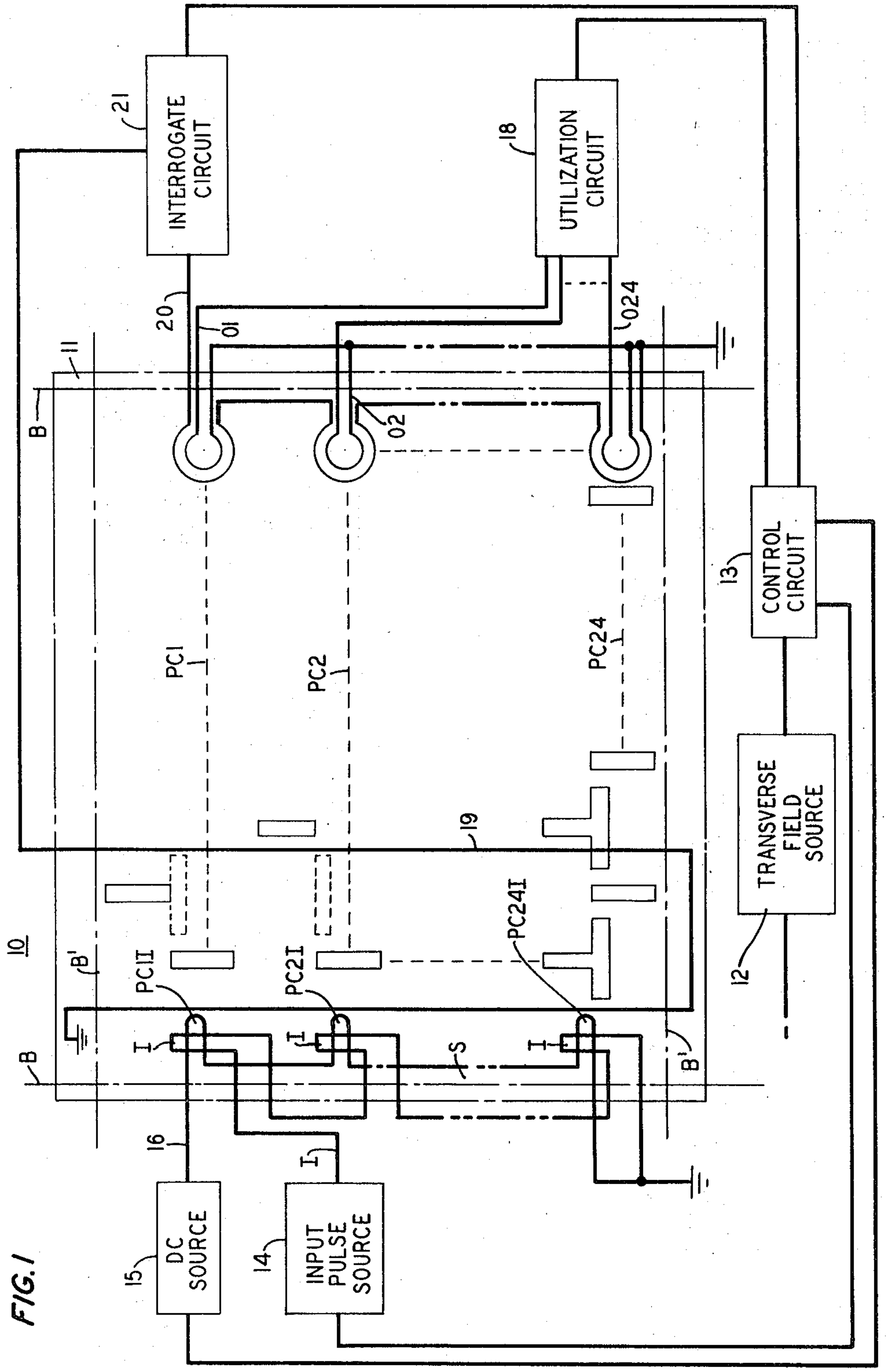
FIG. 1 is a schematic representation of an illustrative arrangement in accordance with this invention.

FIG. 1 shows a multichannel domain propagation arrangement 10 in accordance with this invention. The arrangement includes a sheet of magnetic material 11 in which single wall domains can be moved along propagation channels PC1, PC2 . . . PC24 between input and associated output positions.

Each propagation channel is defined by a pattern of magnetically soft overlays disposed along an axis between input and output positions. Magnetic pole concentrations which attract domains move along the overlays in response to a magnetic field rotated to consecutive orientations in the plane of the sheet in which the domains are moved.

Figure 2:
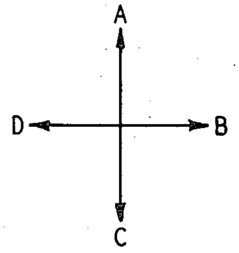
FIG. 2 is a diagram of magnetic field orientations during the operation of the arrangement of FIG. 1.

The fields are generated conveniently by a pulse source comprising two pairs of coils (not shown) oriented orthogonally with respect to sheet 11 along broken lines B and B'. The coils are pulsed in a bipolar manner to generate fields consecutively as indicated by the arrows A, B, C, and D in FIG. 2. The source is indicated by broken block 12 designated "transverse field source" in FIG. 1.

Figure 3:
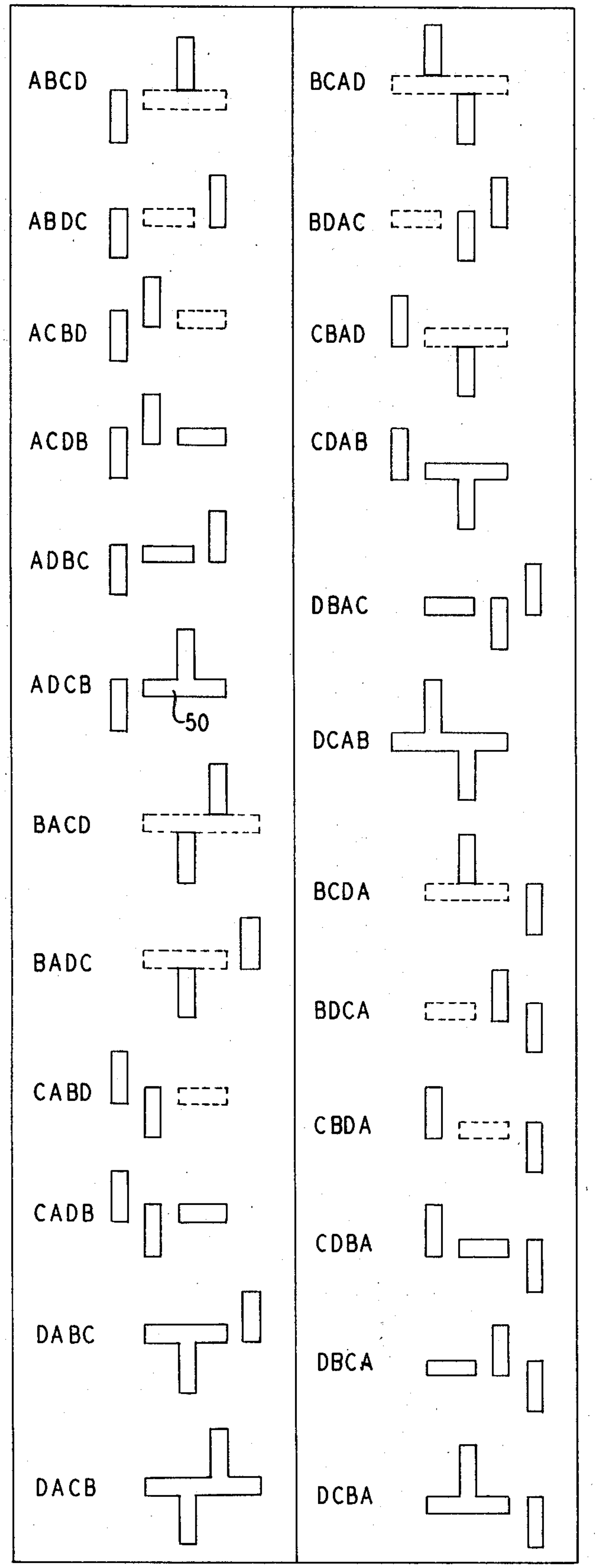
FIG. 3 is a chart of overlay geometries and corresponding field sequences for moving domains therealong.

The overlay pattern for at least an entrance portion of each channel is different as shown in the chart of FIG. 3 to respond uniquely to a particular applied field permutation. Each overlay configuration in FIG. 3 is shown corresponding to a permutation of the four letters A, B, C, and D. The letters in this instance are taken to represent fields oriented as shown by the like designated arrows of FIG. 2. Each configuration responds only to the permuted fields associated with it to generate the proper pole patterns to move a domain. The remaining configurations fail to so respond thus permitting channel selection in the absence of peripheral conductors.

Figure 4A:
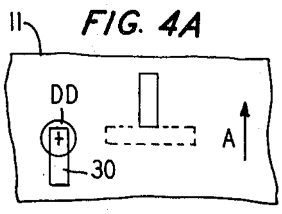
FIGS. 4A, 4B, 4C, and 4D, 5A, 4B, 5C, and 5D, 6A, 6B, 6C, and 6D, and 7A, 7B, 7C, and 7D are schematic representations of portions of the arrangement of FIG. 1 showing the magnetic conditions thereof during operation.
Figure 5A:
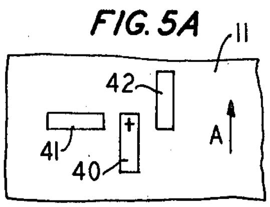
Figure 6A:
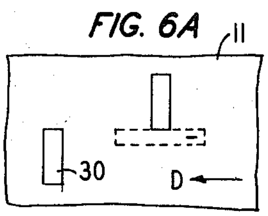
Figure 4B:
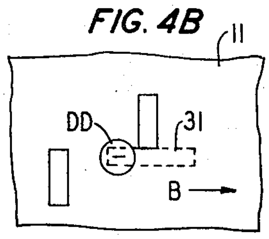
Figure 5B:
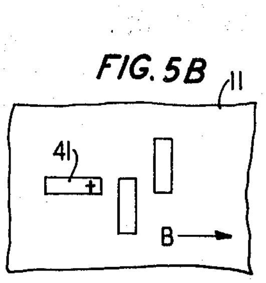

FIGS. 4A through 4D and FIGS. 5A through 5D compare the movement of a domain DD in the entrance portion of each of two channels defined by two different overlay configurations. A domain in this illustration is shown just as a circle. The polarity indication (+ or −) in the circle indicates the attracting pole concentration. The field sequence is A, B, C, and D as can be seen from the figures. The corresponding overlay configuration is shown in column one, first row of FIG. 3. The domain DD is shown occupying the appropriate positions for consecutive advancement. In FIG. 4A, for example, in response to a field A, positive poles are concentrated at the top of bar 30 and domain DD moves to the corresponding positon from an assumed initial position (not shown) at the left as viewed. We will have occasion to discuss the initial position in more detail hereinafter. In FIG. 4B a B field is shown. Strong negative poles are concentrated at the left extreme of bar 31. Bar 31 is shown broken to indicate its position on the surface of sheet 11 opposite to the surface on which bar 30 lies. Negative poles on a bar 30 so positioned attract domains in accordance with the assumed convention and domain DD moves to the position shown in FIG. 4B.

Figure 4C:
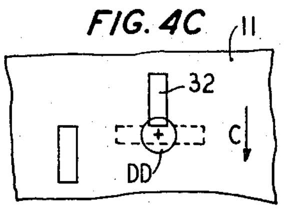
Figure 5C:
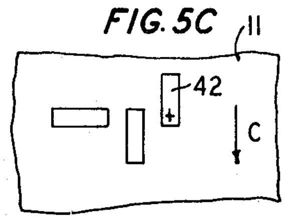
Figure 4D:
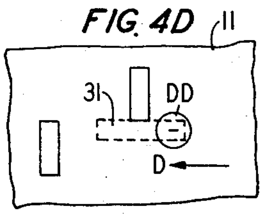

The next applied C field concentrates positive poles at the bottom of bar 32 as shown in FIG. 4C and domain DD moves accordingly. The D field is shown in FIG. 4D resulting in a negative pole concentration at the right end of bar 31 thus urging the domain to that position. It is clear then that the overlay pattern shown in the left-hand column, first row of FIG. 3, exhibits the proper moving pole configuration to advance a domain to next consecutive positions in response to the field sequence ABCD. It will now be shown that an illustrative other overlay pattern shown in FIG. 3 does not so respond to that field sequence.

Figure 5D:
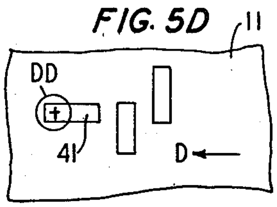

FIGS. 5A through 5D show the overlay pattern of the right-hand column, row five, of FIG. 3 and the consecutive positions occupied by domain DD as the field sequence ABCD is generated. A domain at an initial position (not shown) to the left of bar 40 in FIG. 5A as viewed is not attracted by the positive pole concentrations until that concentration is as shown in FIG. 5D. The attracting pole concentrations (which are all positive for overlays on the top surface of sheet 11) are indicated by the plus signs and appear at the top of bar 40 in FIG. 5A, at the right of bar 41 in FIG. 5B, at the bottom of bar 42 in FIG. 5C, and to the left of bar 41 in FIG. 5D in response to the illustrative field sequence, the last being the first concentration in a position to attract any domain in an initial position. On the other hand, the sequence of fields DBAC does advance a domain properly in channels defined by the overlay pattern of FIGS. 5A through 5D but not in channels defined by the overlay pattern of FIGS. 4A through 4D.

Figure 6B:
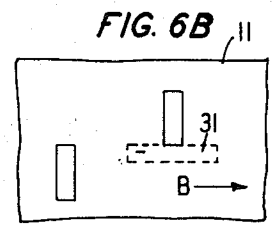
Figure 6C:
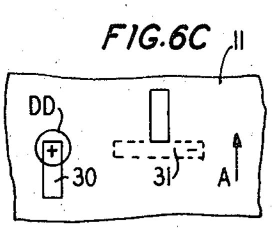
Figure 6D:
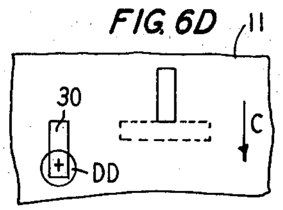

FIGS. 6A through 6D again show the overlay pattern of FIGS. 4A through 4D. In this case though, the field sequence DBAC is applied. The domain however is not attracted to the initial position at the top of bar 30 when the D field is first applied. In response to the next generated B field, no domain is attracted to the position at the left of bar 31 as shown in FIG. 6B. When the A field is next generated, domain DD moves to the position at the top of bar 30 as shown in FIG. 6C and moves to the position at the bottom of bar 30 as shown in FIG. 6D when the C field is finally generated. It should be clear that the field sequence DBAC does not advance a domain in a channel defined by the overlay pattern shown in FIGS. 6A–6D.

Figure 7A:
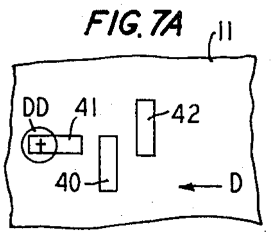
Figure 7B:
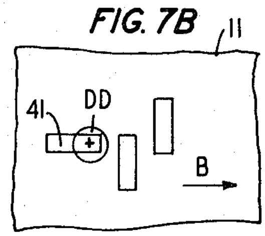
Figure 7C:
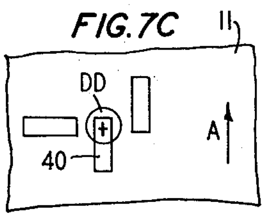
Figure 7D:
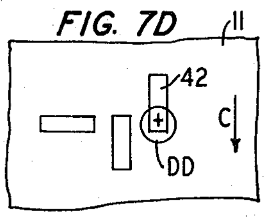

The field sequence DBAC is appropriate for the overlay pattern shown in the arrangement of FIGS. 5A–5D. This overlay pattern is repeated in FIGS. 7A through 7D. When the D field is first generated, domain DD moves to the position at the left of bar 41 as shown in FIG. 7A. When the B field is next generated, the domain moves to the position at the right of bar 41, as shown in FIG. 7B. When the A field is next generated, domain DD moves to the position at the top of bar 40 as shown in FIG. 7C. The next consecutive C field moves the domain to the position at the bottom of bar 42 as shown in FIG. 7D. It is clear then that the field sequence ABCD selects a propagation channel defined by the overlay pattern of column one, row one, of FIG. 3 uniquely whereas the field sequence DBAC selects a channel defined by the pattern of the right-hand column, row five of FIG. 3. It can be shown similarly that a propagation channel defined by the overlay pattern shown in any one of the columns and rows in FIG. 3 can be selected uniquely by the field sequence shown in the same column and row.

Source 12 of FIG. 1 is connected to control circuit 13 for synchronization and activation.

A domain is supplied selectively for propagation in a selected channel in a variety of ways. One illustrative implementation is shown in FIG. 1. The figure shows a source of domains which is a region S of positive magnetization in accordance with the assumed convention. The region S has "protuberances" PC11, PC21 . . . PC241 each of which projects toward the left terminus of a correspondingly designated channel. A hairpin conductor I overlies region S in a manner to sever all the associated protuberances when pulsed thus forming a single wall domain in each channel for propagation. The hairpin conductor is connected between an input pulse source 14 and ground to this end. The presence or absence of a pulse on hairpin conductor I results in the presence or absence of a domain for propagation in each channel. The former represents a binary one, the latter a binary zero. But the representation is moved only in that channel having an overlay corresponding to the selected field sequence. Direct current source 15 applies a current to a conductor 16 which outlines region S for restoring the shape of that region after a hairpin conductor is pulsed. Sources 14 and 15 are connected to control circuit 13 for synchronization and activation as is source 12.

The overlays defining the remainder of each channel may be identical with, for example, that shown for channel PC24 in FIG. 1, selection being provided by the input portion of each. In this instance, once a domain or absence thereof is propagated through a selected entrance portion, all the entrance portions are cleared of domains conveniently by a collapse (negative) field supplied by a pulse on a conductor 19 during an interrogate operation as is described hereinafter. On the other hand, each channel may be defined by a repetitive pattern of overlays as shown in FIG. 3. In this instance, a domain pattern is propagated from an input to an output position in only that channel which has the repetitive overlay pattern corresponding to the applied field sequences. Domains which are not properly propagated by nonselected channels are collapsed by a collapse field generated in all the channels after an entire domain pattern is advanced to an output position in the selected channel.

A selected domain pattern representative of information is advanced in the selected channel to an output position defined by a conductor coupled to the right terminus of the channel as viewed in FIG. 1. The output conductors are designated 01, 02 . . . 024 and are connected between a utilization circuit 18 and ground. A conductor 20 is coupled serially to the right terminus of each of the channels. Conductor 20 is connected between an interrogate circuit 21 and ground and serves to generate a field to collapse a domain in any terminal position so coupled. Conductor 19 also is conveniently connected between circuit 21 and ground for synchronous pulsing during this operation. If a domain is present, the associated output conductor applies a pulse to utilization circuit 18 and simultaneously clears the entrance portions of all channels. Circuits 18 and 21 are connected to control circuit 13.

The various circuits and sources may be any such elements capable of operating in accordance with this invention.

Rather than having a separate output implementation for each cannel, a single implementation may be made to serve a number of channels. Specifically, terminal portions of channels having only unlike entrance portions may include a unique overlay configuration as shown in FIG. 3. In this manner a unique permutation of the fields ABCD passes domains to a single output implementation which may be of a configuration shown for one channel in FIG. 1. Moreover, these configurations need not be of the same configuration as that of the corresponding entrance portion.

Ideally, twenty-four or four factorial (4!) channels are selected as described by entrance portions as shown in FIG. 3. In practice, however, a small member $h$ of these channels may be marginal in operation unless the attracting pole strength is augmented at various positions. The pole strength is augmented conveniently by increasing the length of a bar or T-shaped overlay to cause poles to be spaced further apart. Thus T-shaped overlay 50 in the left-hand column, row six, of FIG. 3 is advantageously six mils long rather than a more typical four mils for bar 41 of FIG. 5A. The dimensions for the bars and T-shaped overlays are consistent with prior art teaching and are not discussed in detail herein. Typical dimensions for say the configuration of FIG. 4A, for example, are one by four mils and one by six for the bar and T-shaped overlays respectively, the top of the T-shaped overlay being sufficiently long so that an attracting pole concentration at one end opposite to that occupied by a domain is insufficient to move that domain. A domain for movement by pole concentrations on patterns with such dimensions is typically one mil in diameter.

A reduction in the dimensions of the overlay by say an order of magnitude permits the movement of domains having diameters in the submicron range.

The invention has been described in terms of four perpendicular fields. But fewer or more than four fields are useful in accordance with this invention. The fact that the fields are mutually perpendicular is advantageous from an operating margin standpoint because overlay design can take advantage of the fact that nonselected channels include overlays perpendicular to and thus only negligibly magnetized by the fields of a selected sequence. When nonperpendicular orientations for overlays are used, nonselected channels may have overlays which are partially magnetized by select fields and may attract domains to spurious advanced positions. Regardless of the number $n$ of distinctly oriented fields separately applied in accordance with this invention ($n!$) channels can be selected thereby ideally.

What has been described is considered only illustrative of the principles of this invention. Accordingly, various modifications may be devised in accordance with those principles by those skilled in the art without departing from the spirit and scope of this invention.

What is claimed is:

1. Domain propagation apparatus comprising a sheet of material in which single wall domains can be moved, means for defining in said sheet a plurality of propagation channels for single wall domains between input and associated output positions, said last-mentioned means including for each of said channels a characteristic different overlay pattern adjacent said sheet for generating unique patterns of magnetic pole concentrations which attract domains and move domains between input and output positions only in response to magnetic fields in a corresponding sequence in the plane of said sheet, means for controllably generating different sequences of magnetic fields in the plane of said sheet, means for selectively, introducing single wall domains at said input positions, and means for detecting the presence and absence of domains at said output positions.

2. Apparatus in accordance with claim 1 wherein said field sequences comprise $n$ consecutive fields generated at consecutive $360/n$ degree orientations.

3. Apparatus in accordance with claim 2 wherein $n=4$ fields A, B, C, and D at 90 degree orientations with respect to one another.

4. Apparatus in accordance with claim 3 wherein each of said channels includes an overlay configuration of a geometry to advance single wall domains in response to a selected permutation of the fields A, B, C, and D.

5. Apparatus in accordance with claim 4 wherein each of said channels is defined by a bar and T-shaped overlay configuration aligned along an axis between input and output positions.

6. Apparatus in accordance with claim 4 wherein each of said channels includes an entrance portion having a characteristic bar and T-shaped overlay configuration in which domains are propagated in response to selected permutation of the fields A, B, C, and D.

7. Apparatus in accordance with claim 4 wherein each of said channels includes a repetitive like overlay configuration in which domains are propagated from input to output positions in response to a selected permutation of the fields A, B, C, and D.

8. Apparatus comprising a sheet of magnetic material in which single wall domains can be moved and a plurality of uniquely different overlay patterns contiguous said sheet for defining a plurality of propagation channels for said domains, said overlay pattern for each of said channels being of a characteristic configuration for exhibiting a magnetic pole pattern which attracts domains from an input to an associated output position in response to magnetic fields generated only in a corresponding sequence in the plane of said sheet.

References Cited

UNITED STATES PATENTS

| | | | |
|---|---|---|---|
| 3,140,471 | 7/1964 | Fuller | 340—174 |
| 3,460,116 | 8/1969 | Bobeck et al. | 340—174 |

STANLEY M. URYNOWICZ, Jr., Primary Examiner